United States Patent
Glasco

(10) Patent No.: US 7,103,636 B2
(45) Date of Patent: *Sep. 5, 2006

(54) METHODS AND APPARATUS FOR SPECULATIVE PROBING OF A REMOTE CLUSTER

(75) Inventor: David B. Glasco, Austin, TX (US)

(73) Assignee: Newisys, Inc., Austin, TX (US)

( * ) Notice: Subject to any disclaimer, the term of this patent is extended or adjusted under 35 U.S.C. 154(b) by 413 days.

This patent is subject to a terminal disclaimer.

(21) Appl. No.: 10/157,388

(22) Filed: May 28, 2002

(65) Prior Publication Data

US 2003/0225979 A1 Dec. 4, 2003

(51) Int. Cl.
*G06F 13/14* (2006.01)
*G06F 12/16* (2006.01)

(52) U.S. Cl. .................. 709/206; 709/216; 709/217; 711/141; 711/146

(58) Field of Classification Search ......... 709/206–213, 709/216–218, 219; 711/141–146
See application file for complete search history.

(56) References Cited

U.S. PATENT DOCUMENTS

| | | | |
|---|---|---|---|
| 4,667,287 A | 5/1987 | Allen et al. ................. | 709/234 |
| 5,166,674 A | 11/1992 | Baum et al. ................. | 714/752 |
| 5,191,651 A | 3/1993 | Halim et al. ................. | 709/250 |

(Continued)

FOREIGN PATENT DOCUMENTS

| | | |
|---|---|---|
| EP | 0978781 | 2/2000 |
| WO | WO0239242 | 5/2002 |

OTHER PUBLICATIONS

*HyperTransport ™ I/O Link Specification Revision 1.03*, HyperTransport ™ Consortium, Oct. 10, 2001, Copyright © 2001 HyperTransport Technology Consortium.

D. E. Culler, J. P. Singh, A. Gupta, "Parallel Computer Architecture", 1999 Morgan Kaufmann, San Francisco, CA USA XP002277658.

Andrew Tanenbaum, "Computer Networks", Computer Networks, London: Prentice Hall International, GB, 1996, pp. 345–403, XP002155220.

GLASCO, David Brian, "Methods And Apparatus For Speculative Probing At A Request Cluster," U.S. Appl. No. 10/106,426, filed Mar. 22, 2002, Office Action mailed Sep. 22, 2004.

GLASCO, David Brian, "Methods And Apparatus For Speculative Probing With Early Completion And Delayed Request," U.S. Appl. No. 10/106,430, filed Mar. 22, 2002, Office Action mailed Sep. 23, 2004.

GLASCO, David Brian, "Methods And Apparatus For Speculative Probing With Early Completion And Early Request," U.S. Appl. No. 10/106,299, filed Mar. 22, 2002, Office Action mailed Sep. 22, 2004.

(Continued)

*Primary Examiner*—Kevin Verbrugge
(74) *Attorney, Agent, or Firm*—Beyer Weaver & Thomas, LLP.

(57) ABSTRACT

According to the present invention, methods and apparatus are provided for increasing the efficiency of data access in a multiple processor, multiple cluster system. Techniques are provided for speculatively probing a remote cluster from either a request cluster or a home cluster. A speculative probe associated with a particular memory line is transmitted to the remote cluster before the cache access request associated with the memory line is serialized at a home cluster. When a non-speculative probe is received at a remote cluster, the information associated with the response to the speculative probe is used to provide a response to the non-speculative probe.

36 Claims, 15 Drawing Sheets

U.S. PATENT DOCUMENTS

| | | | |
|---|---|---|---|
| 5,195,089 A | 3/1993 | Sindhu et al. | |
| 5,197,130 A | 3/1993 | Chen et al. | 712/3 |
| 5,301,311 A | 4/1994 | Fushimi et al. | 714/23 |
| 5,371,852 A | 12/1994 | Attanasio et al. | 709/245 |
| 5,394,555 A * | 2/1995 | Hunter et al. | 711/148 |
| 5,561,768 A | 10/1996 | Smith | 712/13 |
| 5,623,644 A | 4/1997 | Self et al. | 713/503 |
| 5,682,512 A | 10/1997 | Tetrick | 711/202 |
| 5,692,123 A | 11/1997 | Logghe | |
| 5,829,032 A | 10/1998 | Komuro et al. | 711/141 |
| 5,931,938 A | 8/1999 | Drogichen et al. | 712/15 |
| 6,018,791 A * | 1/2000 | Arimilli et al. | 711/141 |
| 6,038,651 A * | 3/2000 | VanHuben et al. | 712/21 |
| 6,047,332 A | 4/2000 | Viswanathan et al. | 709/245 |
| 6,067,603 A * | 5/2000 | Carpenter et al. | 711/141 |
| 6,148,378 A | 11/2000 | Bordaz et al. | 711/147 |
| 6,167,492 A | 12/2000 | Keller et al. | 711/154 |
| 6,192,451 B1 * | 2/2001 | Arimilli et al. | 711/141 |
| 6,219,775 B1 | 4/2001 | Wade et al. | 712/11 |
| 6,226,671 B1 | 5/2001 | Hagersten et al. | 709/215 |
| 6,256,671 B1 | 7/2001 | Strentzsch et al. | 709/227 |
| 6,259,701 B1 | 7/2001 | Shur et al. | 370/401 |
| 6,292,705 B1 | 9/2001 | Wang et al. | |
| 6,330,643 B1 * | 12/2001 | Arimilli et al. | 711/141 |
| 6,331,983 B1 | 12/2001 | Haggerty et al. | 370/400 |
| 6,334,172 B1 * | 12/2001 | Arimilli et al. | 711/144 |
| 6,338,122 B1 * | 1/2002 | Baumgartner et al. | 711/141 |
| 6,370,585 B1 | 4/2002 | Hagersten et al. | 709/238 |
| 6,385,705 B1 | 5/2002 | Keller et al. | 711/154 |
| 6,397,255 B1 | 5/2002 | Nurenberg et al. | 709/228 |
| 6,405,289 B1 * | 6/2002 | Arimilli et al. | 711/145 |
| 6,463,529 B1 | 10/2002 | Miller et al. | |
| 6,467,007 B1 | 10/2002 | Armstrong et al. | |
| 6,490,661 B1 | 12/2002 | Keller et al. | 711/150 |
| 6,542,926 B1 * | 4/2003 | Zalewski et al. | 709/213 |
| 6,578,071 B1 | 6/2003 | Hagersten et al. | 709/215 |
| 6,615,319 B1 * | 9/2003 | Khare et al. | 711/141 |
| 6,631,447 B1 * | 10/2003 | Morioka et al. | 711/141 |
| 6,633,945 B1 | 10/2003 | Fu et al. | 710/316 |
| 6,633,960 B1 * | 10/2003 | Kessler et al. | 711/144 |
| 6,704,842 B1 * | 3/2004 | Janakiraman et al. | 711/141 |
| 6,738,870 B1 * | 5/2004 | Van Huben et al. | 711/150 |
| 6,738,871 B1 * | 5/2004 | Van Huben et al. | 711/147 |
| 6,751,698 B1 * | 6/2004 | Deneroff et al. | 710/317 |
| 6,751,721 B1 * | 6/2004 | Webb, Jr. et al. | 712/10 |
| 6,754,782 B1 * | 6/2004 | Arimilli et al. | 711/144 |
| 6,760,809 B1 | 7/2004 | Arimilli et al. | 711/119 |
| 6,760,819 B1 | 7/2004 | Dhong et al. | |
| 6,799,252 B1 | 9/2004 | Bauman | |
| 6,826,660 B1 | 11/2004 | Hagersten et al. | 711/153 |
| 6,847,993 B1 | 1/2005 | Novaes et al. | 709/221 |
| 6,856,621 B1 | 2/2005 | Artes | 370/390 |
| 6,892,282 B1 * | 5/2005 | Hass et al. | 711/146 |
| 6,920,519 B1 | 7/2005 | Beukema et al. | 710/306 |
| 2001/0014097 A1 | 8/2001 | Beck et al. | 370/401 |
| 2001/0037435 A1 | 11/2001 | Van Doren | |
| 2002/0004915 A1 | 1/2002 | Fung | 713/320 |
| 2002/0007463 A1 | 1/2002 | Fung | |
| 2002/0052914 A1 * | 5/2002 | Zalewski et al. | 709/203 |
| 2002/0083149 A1 * | 6/2002 | Van Huben et al. | 709/215 |
| 2002/0083243 A1 * | 6/2002 | Van Huben et al. | 710/107 |
| 2002/0087811 A1 * | 7/2002 | Khare et al. | 711/146 |
| 2002/0156888 A1 | 10/2002 | Lee et al. | 709/224 |
| 2003/0009623 A1 | 1/2003 | Arimilli et al. | 711/119 |
| 2003/0182508 A1 | 9/2003 | Glasco | |
| 2003/0182509 A1 | 9/2003 | Glasco | |
| 2003/0182514 A1 | 9/2003 | Glasco | |
| 2003/0195939 A1 | 10/2003 | Edirisooriya et al. | 709/212 |
| 2003/0196047 A1 * | 10/2003 | Kessler et al. | 711/147 |
| 2003/0210655 A1 | 11/2003 | Glasco | |
| 2003/0212741 A1 | 11/2003 | Glasco | |
| 2003/0225909 A1 | 12/2003 | Glasco et al. | |
| 2003/0225938 A1 | 12/2003 | Glasco et al. | |
| 2003/0225978 A1 | 12/2003 | Glasco | |
| 2003/0233388 A1 | 12/2003 | Glasco et al. | |
| 2004/0073755 A1 * | 4/2004 | Webb et al. | 711/144 |
| 2004/0098475 A1 | 5/2004 | Zeitler et al. | 709/223 |

OTHER PUBLICATIONS

Zeitler et al., "Methods And Apparatus For Distributing System Management Signals", PCT/US03/34687, Int'l filing date Oct. 20, 2003, Partial search report mailed May 28, 2004.

Zeitler et al., "Methods And Apparatus For Distributing System Management Signals", PCT/US03/34687, Int'l filing date Oct. 20, 2003, Int'l search report mailed Aug. 17, 2004.

U.S. Office Action mailed Jul. 20, 2005, from related Application No. 10/608,846.

U.S. Office Action mailed Nov. 2, 2005, from related Application No. 10/106,430.

U.S. Office Action mailed Sep. 21, 2005, from related Application No. 10/157,384.

U.S. Office Action mailed Oct. 20, 2005, from related Application No. 10/156,893.

U.S. Office Action mailed Sep. 21, 2005, from related Application No. 10/157,409.

U.S. Office Action mailed Mar. 7, 2005, from related Application No.10/106,426.

U.S. Office Action mailed Jul. 21, 2005, from related Application No. 10/106,426.

U.S. Office Action mailed Mar. 10, 2005, from related Application No. 10/106,430.

U.S. Office Action mailed Jul. 21, 2005, from related Application No. 10/106,430.

U.S. Office Action mailed Mar. 10, 2005, from related Application No. 10/106,299.

U.S. Office Action mailed Jul. 21, 2005, from related Application No. 10/106,299.

* cited by examiner

METHODS AND APPARATUS FOR SPECULATIVE PROBING OF A REMOTE CLUSTER

CROSS-REFERENCE TO RELATED APPLICATIONS

The present application is related to U.S. application Ser. No. 10/106,426 titled Methods And Apparatus For Speculative Probing At A Request Cluster, U.S. application Ser. No. 10/106,430 titled Methods And Apparatus For Speculative Probing With Early Completion And Delayed Request, and U.S. application Ser. No. 10/106,299 titled Methods And Apparatus For Speculative Probing With Early Completion And Early Request, the entireties of which are incorporated by reference herein for all purposes. The present application is also related to U.S. application Ser. Nos. 10/145,439 and 10/145,438 both titled Methods And Apparatus For Responding To A Request Cluster by David B. Glasco filed on May 13, 2002, the entireties of which are incorporated by reference for all purposes. Furthermore, the present application is related to concurrently filed U.S. application Ser. No. 10/157,340 also titled Methods And Apparatus For Speculative Probing Of A Remote Cluster by David B. Glasco, the entirety of which is incorporated by reference for all purposes.

The present application is also related to concurrently filed U.S. application Ser. Nos. 10/157,384, 10/156,893, and 10/157,409 titled Transaction Management In Systems Having Multiple Multi-Processor Clusters, Routing Mechanisms In Systems Having Multiple Multi-Processor Clusters, and Address Space Management In Systems Having Multiple Multi-Processor Clusters respectively, all by David B. Glasco, Carl Zeitler, Rajesh Kota, Guru Prasadh, and Richard R. Oehler, the entireties of which are incorporated by reference for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Data access in multiple processor systems can raise issues relating to cache coherency. Conventional multiple processor computer systems have processors coupled to a system memory through a shared bus. In order to optimize access to data in the system memory, individual processors are typically designed to work with cache memory. In one example, each processor has a cache that is loaded with data that the processor frequently accesses. The cache is read or written by a processor. However, cache coherency problems arise because multiple copies of the same data can co-exist in systems having multiple processors and multiple cache memories. For example, a frequently accessed data block corresponding to a memory line may be loaded into the cache of two different processors. In one example, if both processors attempt to write new values into the data block at the same time, different data values may result. One value may be written into the first cache while a different value is written into the second cache. A system might then be unable to determine what value to write through to system memory.

A variety of cache coherency mechanisms have been developed to address such problems in multiprocessor systems. One solution is to simply force all processor writes to go through to memory immediately and bypass the associated cache. The write requests can then be serialized before overwriting a system memory line. However, bypassing the cache significantly decreases efficiency gained by using a cache. Other cache coherency mechanisms have been developed for specific architectures. In a shared bus architecture, each processor checks or snoops on the bus to determine whether it can read or write a shared cache block. In one example, a processor only writes an object when it owns or has exclusive access to the object. Each corresponding cache object is then updated to allow processors access to the most recent version of the object.

Bus arbitration is used when both processors attempt to write a shared data block in the same clock cycle. Bus arbitration logic decides which processor gets the bus first. Although, cache coherency mechanisms such as bus arbitration are effective, using a shared bus limits the number of processors that can be implemented in a single system with a single memory space.

Other multiprocessor schemes involve individual processor, cache, and memory systems connected to other processors, cache, and memory systems using a network backbone such as Ethernet or Token Ring. Multiprocessor schemes involving separate computer systems each with its own address space can avoid many cache coherency problems because each processor has its own associated memory and cache. When one processor wishes to access data on a remote computing system, communication is explicit. Messages are sent to move data to another processor and messages are received to accept data from another processor using standard network protocols such as TCP/IP. Multiprocessor systems using explicit communication including transactions such as sends and receives are referred to as systems using multiple private memories. By contrast, multiprocessor system using implicit communication including transactions such as loads and stores are referred to herein as using a single address space.

Multiprocessor schemes using separate computer systems allow more processors to be interconnected while minimizing cache coherency problems. However, it would take substantially more time to access data held by a remote processor using a network infrastructure than it would take to access data held by a processor coupled to a system bus. Furthermore, valuable network bandwidth would be consumed moving data to the proper processors. This can negatively impact both processor and network performance.

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions. However, using a point-to-point architecture to connect multiple processors in a multiple cluster system sharing a single memory space presents its own problems.

Consequently, it is desirable to provide techniques for improving data access and cache coherency in systems having multiple clusters of multiple processors connected using point-to-point links.

SUMMARY OF THE INVENTION

According to the present invention, methods and apparatus are provided for increasing the efficiency of data access in a multiple processor, multiple cluster system. Techniques are provided for speculatively probing a remote cluster from either a request cluster or a home cluster. A speculative probe associated with a particular memory line is transmitted to the remote cluster before the cache access request associated with the memory line is serialized at a home cluster. When a non-speculative probe is received at a remote cluster, the information associated with the response to the speculative probe is used to provide a response to the non-speculative probe.

According to various embodiments, a computer system is provided. The computer system includes a request cluster, a home cluster, and a remote cluster. The request cluster has a plurality of interconnected request cluster processors and a request cluster cache coherence controller. The home cluster has a plurality of interconnected home processors, a serialization point, and a home cache coherence controller. The remote cluster has a plurality of interconnected remote processors and a remote cache coherence controller. The remote cluster is configured to receive a first probe corresponding to a cache access request from a request cluster processor in the request cluster and a second probe corresponding to the cache access request from the home cluster.

According to other embodiments, a method for a cache coherence controller to manage data access in a multiprocessor system is provided. The method includes receiving a cache access request from a request cluster processor associated with a request cluster, forwarding the cache access request to a home cluster, and sending a probe associated with the cache request to a remote cluster. The home cluster includes a home cluster cache coherence controller and a serialization point.

According to still other embodiments, a computer system is provided. The computer system includes a first cluster and a second cluster. The first cluster includes a first plurality of processors and a first cache coherence controller. The first plurality of processors and the first cache coherence controller are interconnected in a point-to-point architecture. The second cluster includes a second plurality of processors and a second cache coherence controller. The second plurality of processors and the second cache coherence controller are interconnected in a point-to-point architecture, the first cache coherence controller is coupled to the second cache coherence controller. The first cache coherence controller is configured to receive a cache access request originating from the first plurality of processors and send a probe to a third cluster including a third plurality of processors before the cache access request is received by a serialization point in the second cluster.

In still other embodiments, a computer system is provided. The computer system includes a first cluster and a second cluster. The first cluster includes a first plurality of processors and a first cache coherence controller. The first plurality of processors and the first cache coherence controller are interconnected in a point-to-point architecture. The second cluster includes a second plurality of processors and a second cache coherence controller. The second plurality of processors and the second cache coherence controller are interconnected in a point-to-point architecture. The first cache coherence controller is coupled to the second cache coherence controller and constructed to receive a cache access request originating from the first plurality of processors and send a probe to a third cluster including a third plurality of processors before a memory line associated with the cache access request is locked.

In yet another embodiment, a cache coherence controller is provided. The cache coherence controller includes interface circuitry coupled to a request cluster processor in a request cluster and a remote cluster cache coherence controller in a remote cluster and a protocol engine coupled to the interface circuitry. The protocol engine is configured to receive a cache access request from the request cluster processor and speculatively probe a remote node in the remote cluster.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1A:
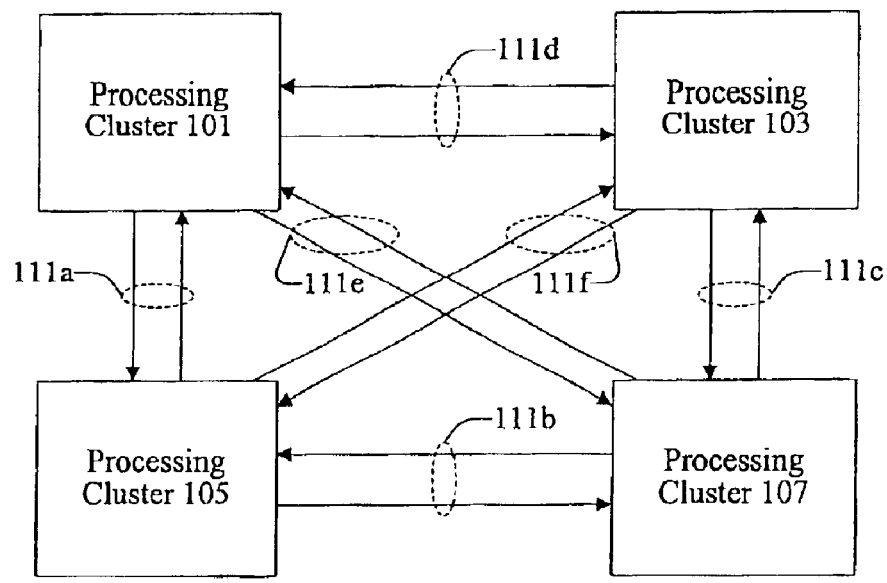
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multiprocessor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, speculative probing is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for sending probes to nodes associated with cache blocks before a request associated with the probes is received at a serialization point is referred to herein as speculative probing.

According to various embodiments, the reordering or elimination of certain data access requests do not adversely affect cache coherency. That is, the end value in the cache is the same whether or not snooping occurs. For example, a local processor attempting to read the cache data block can be allowed to access the data block without sending the requests through a serialization point in certain circumstances. In one example, read access can be permitted when the cache block is valid and the associated memory line is not locked. Techniques for performing speculative probing generally are described in U.S. application Ser. No. 10/106,426 titled Methods And Apparatus For Speculative Probing At A Request Cluster, U.S. application Ser. No. 10/106,430 titled Methods And Apparatus For Speculative Probing With Early Completion And Delayed Request, and U.S. application Ser. No. 10/106,299 titled Methods And Apparatus For Speculative Probing With Early Completion And Early Request, the entireties of which are incorporated by reference herein for all purposes. By completing a data access transaction within a local cluster, the delay associated with transactions in a multiple cluster system can be reduced or eliminated.

The techniques of the present invention recognize that other efficiencies can be achieved, particularly when speculative probing can not be completed at a local cluster. In one example, a cache access request is forwarded from a local cluster to a home cluster. A home cluster then proceeds to send probes to remote clusters in the system. In typical implementations, the home cluster gatherers the probe responses corresponding to the probe before sending an aggregated response to the request cluster. The aggregated response typically includes the results of the home cluster probes and the results of the remote cluster probes. The techniques of the present invention provide techniques for more efficiently probing a remote cluster. In typical implementations, a remote cluster is probed after a cache access request is ordered at a home cluster serialization point. The remote cluster then waits for the results of the probe and sends the results back to the request cluster. In some examples, the results are sent directly to the request cluster or to the request cluster through the home cluster. According to various embodiments, a speculative probe is sent to the remote cluster first to begin the probing of the remote nodes. When the probe transmitted after the request is serialized arrives at the remote cluster, the results of the speculative probe can be used to provide a faster response to the request cluster.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111*a–f*. In one embodiment, the multiple processors in the multiple cluster architecture shown in FIG. 1A share the same memory space. In this example, the point-to-point links 111*a–f* are internal system connections that are used in place of a traditional front-side bus to connect the multiple processors in the multiple clusters 101, 103, 105, and 107. The point-to-point links may support any point-to-point coherence protocol.

Figure 1B:
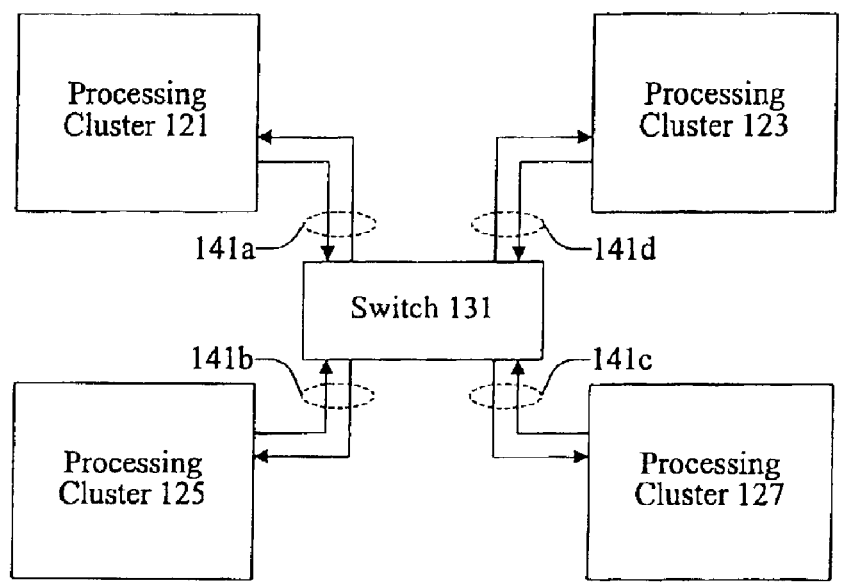

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141*a–d*. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
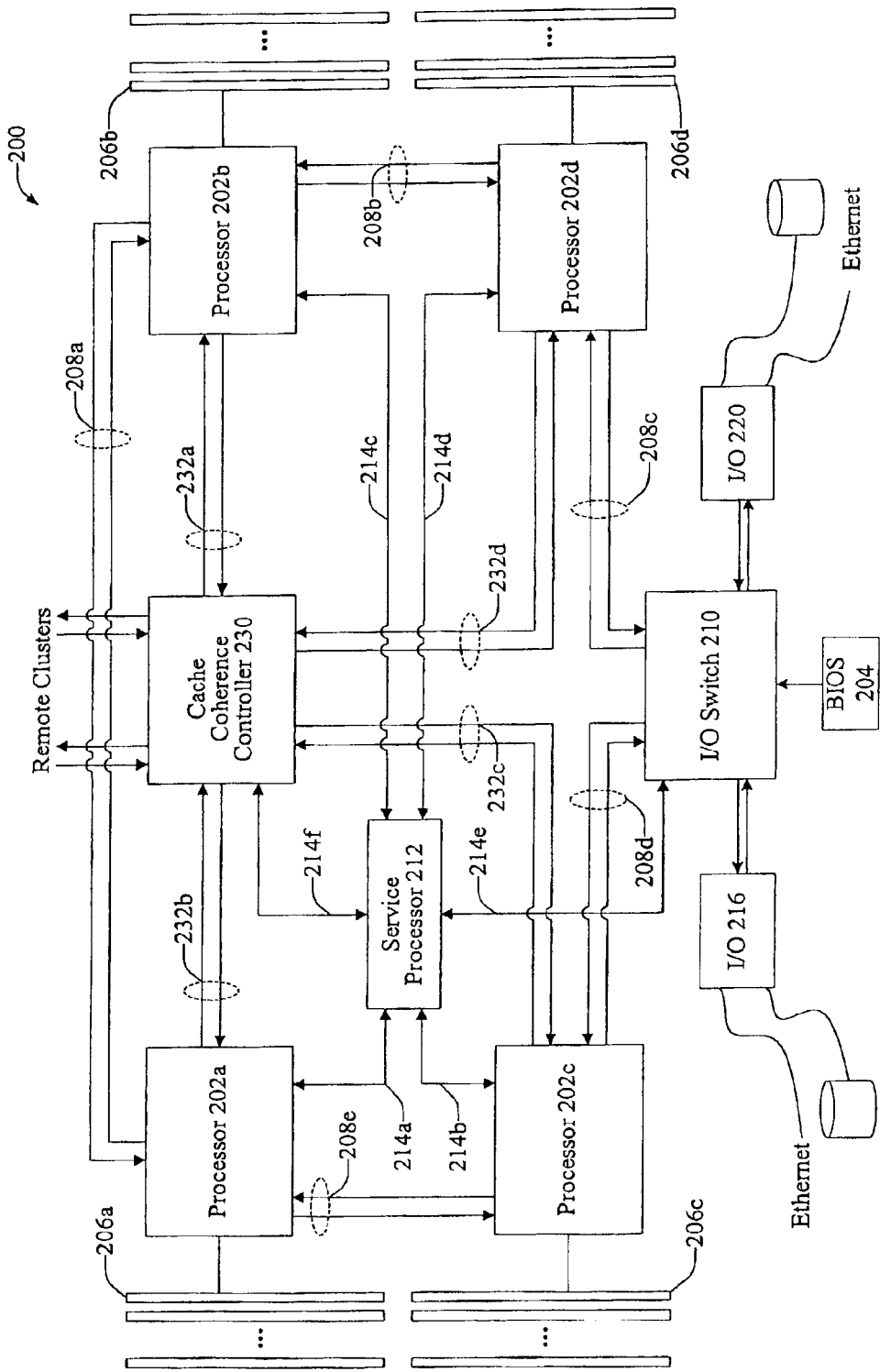
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202*a*–202*d*, one or more Basic I/O systems (BIOS) 204, a memory subsystem comprising memory banks 206*a*–206*d*, point-to-point communication links 208*a*–208*e*, and a service processor 212. The point-to-point communication links are configured to allow interconnections between processors 202*a*–202*d*, I/O switch 210, and cache coherence controller 230. The service processor 212 is configured to allow communications with processors 202*a*–202*d*, I/O switch 210, and cache coherence controller 230 via a JTAG interface represented in FIG. 2 by links 214*a*–214*f*. It should be noted that other interfaces are supported. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein. The service processor and computer system partitioning are described in U.S. patent application Ser. No. 09/932,456 titled Computer System Partitioning Using Data Transfer Routing Mechanism, filed on Aug. 16, 2001, the entirety of which is incorporated by reference for all purposes.

The processors 202*a*–*d* are also coupled to a cache coherence controller 230 through point-to-point links 232*a*–*d*. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202*a*–*d* as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206*a*–206*d* may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array. In another embodiment, the cache coherence controller is a general purpose processor with an interface to the point-to-point links 232.

Figure 3:
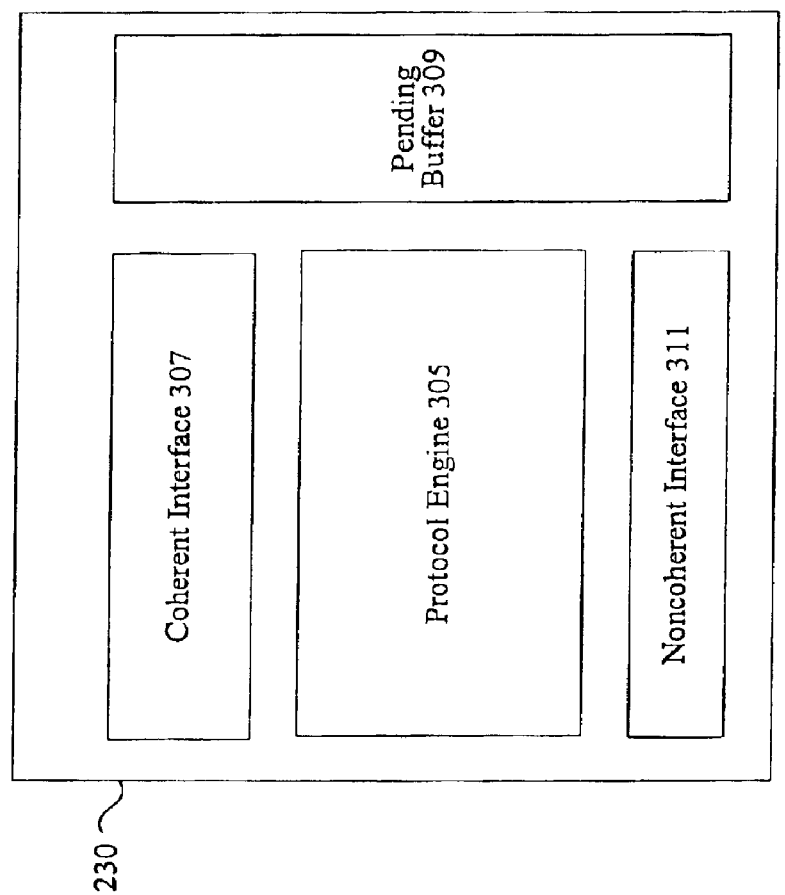
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
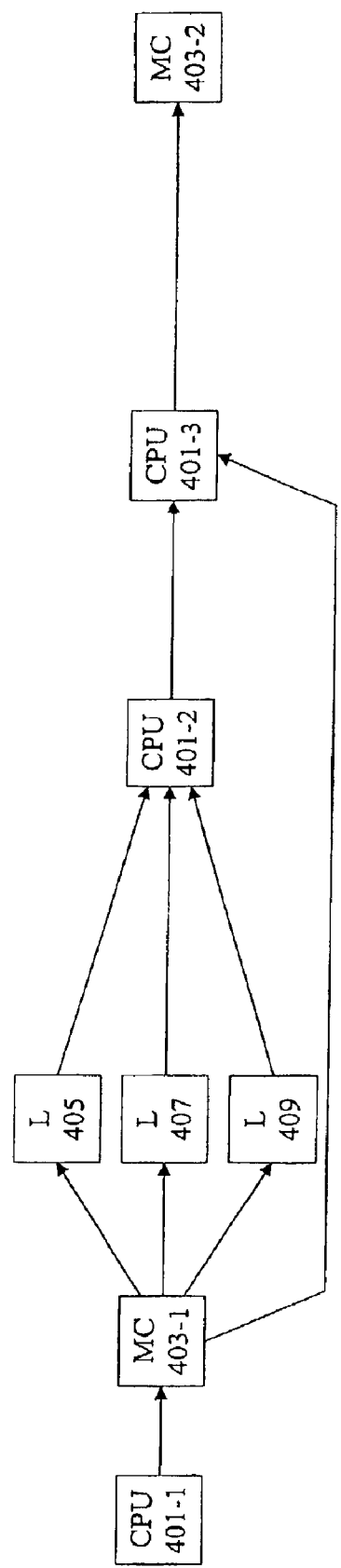
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A–5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
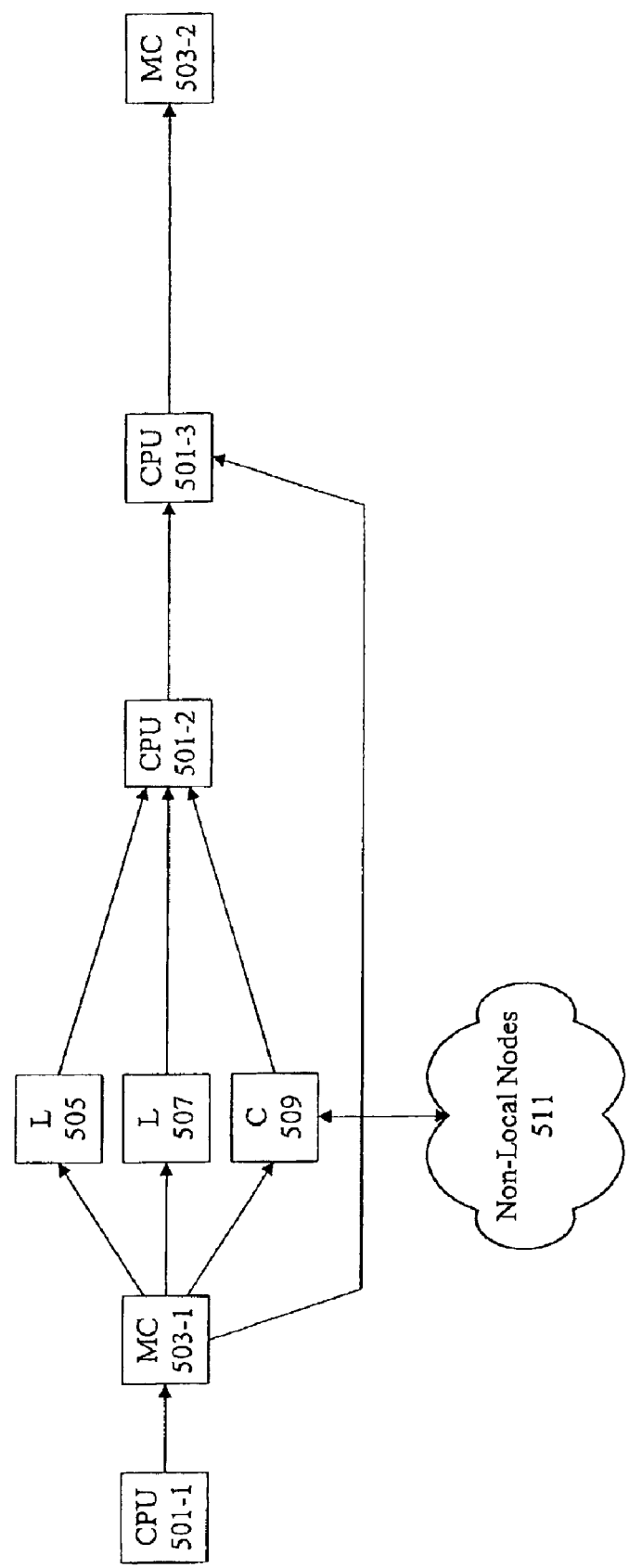
FIGS. 5A–5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
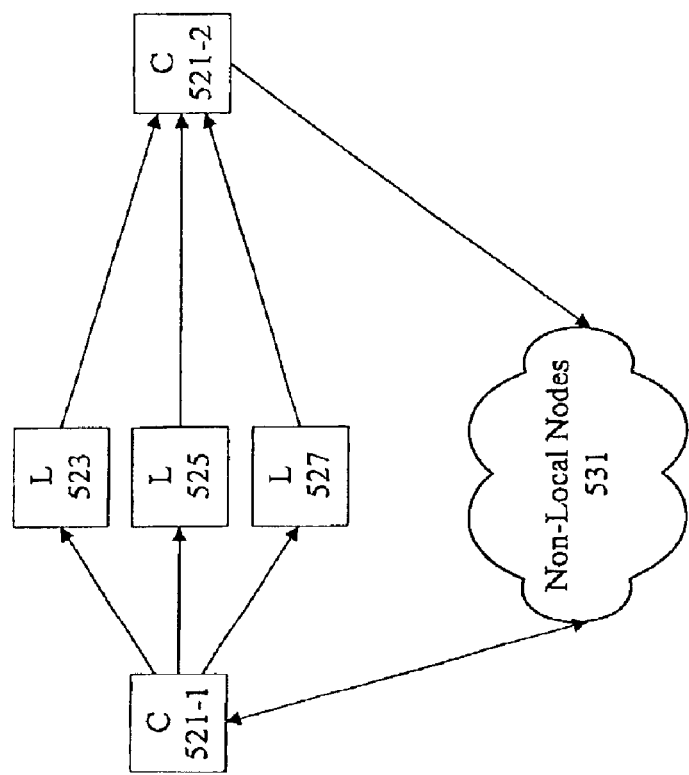

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
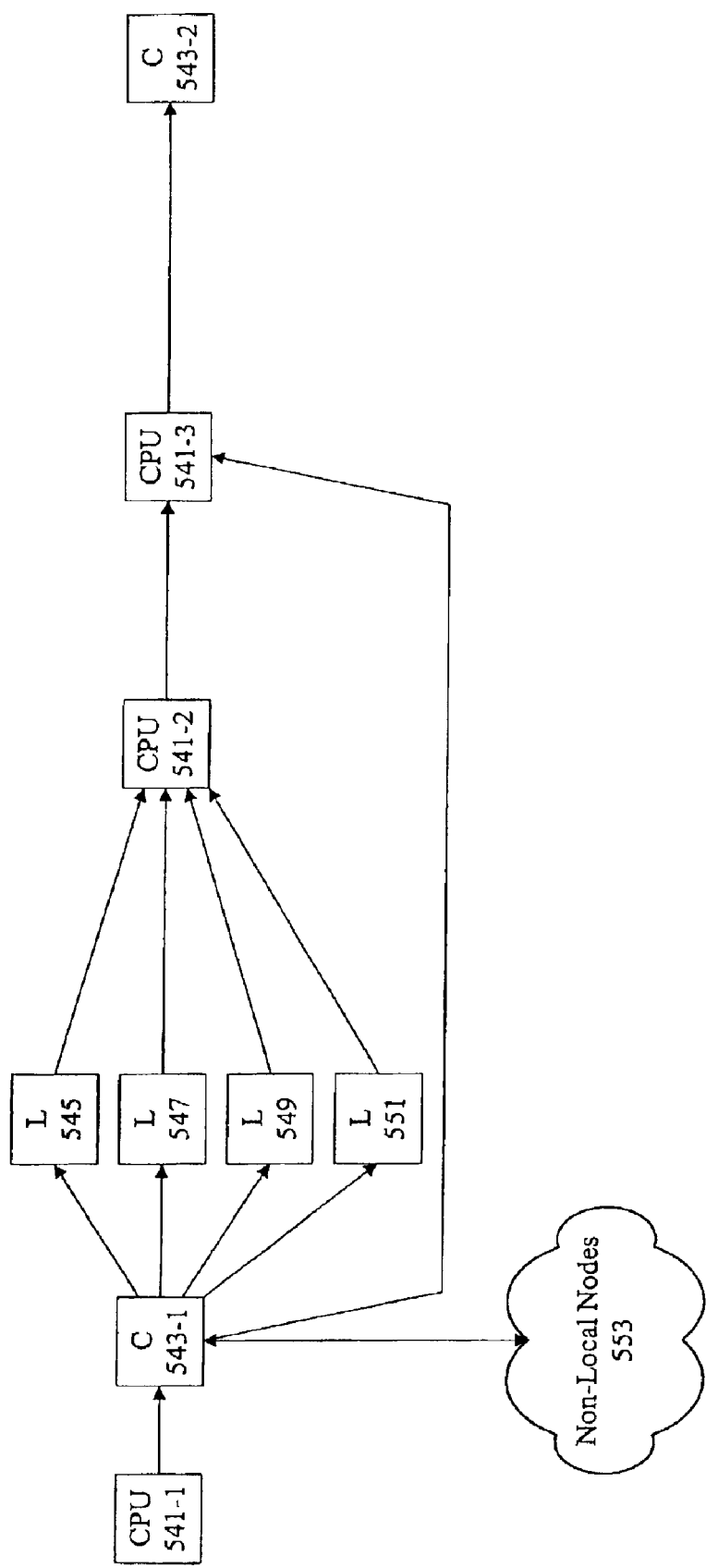

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
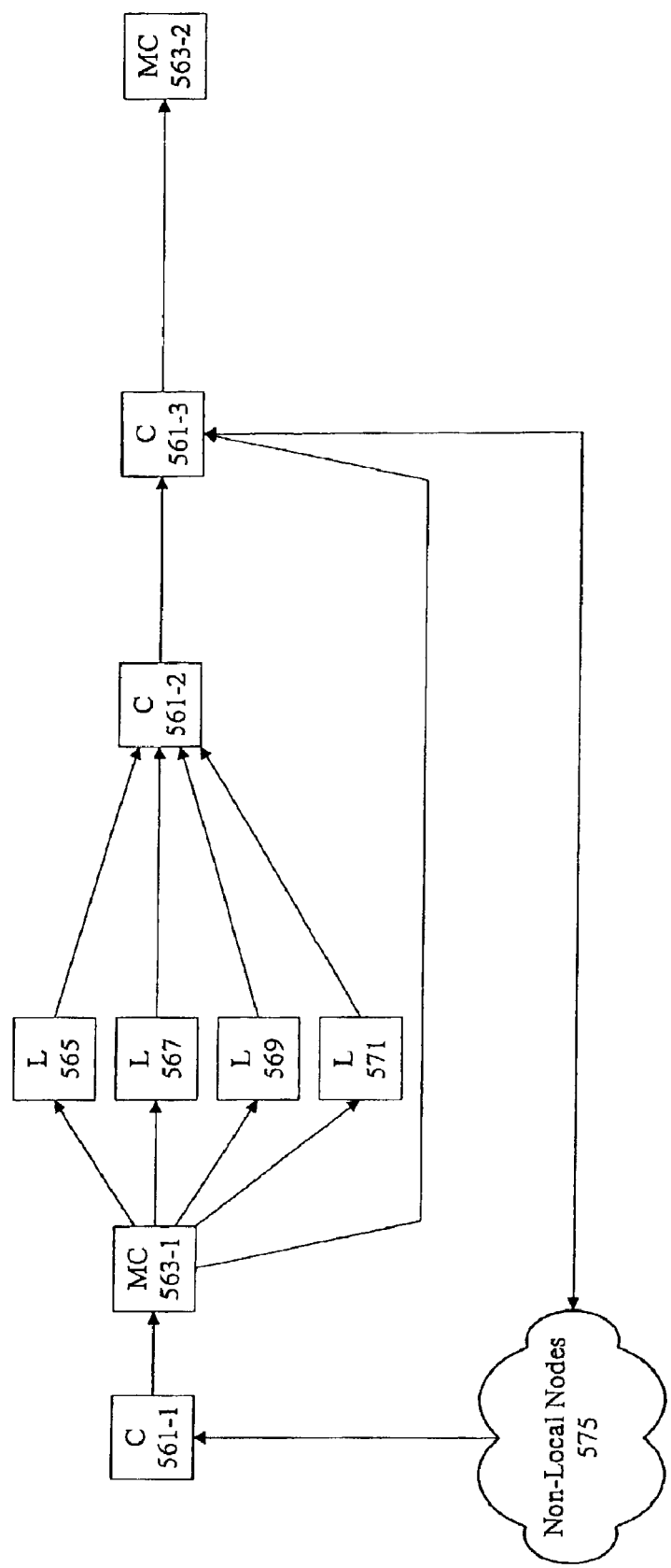

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
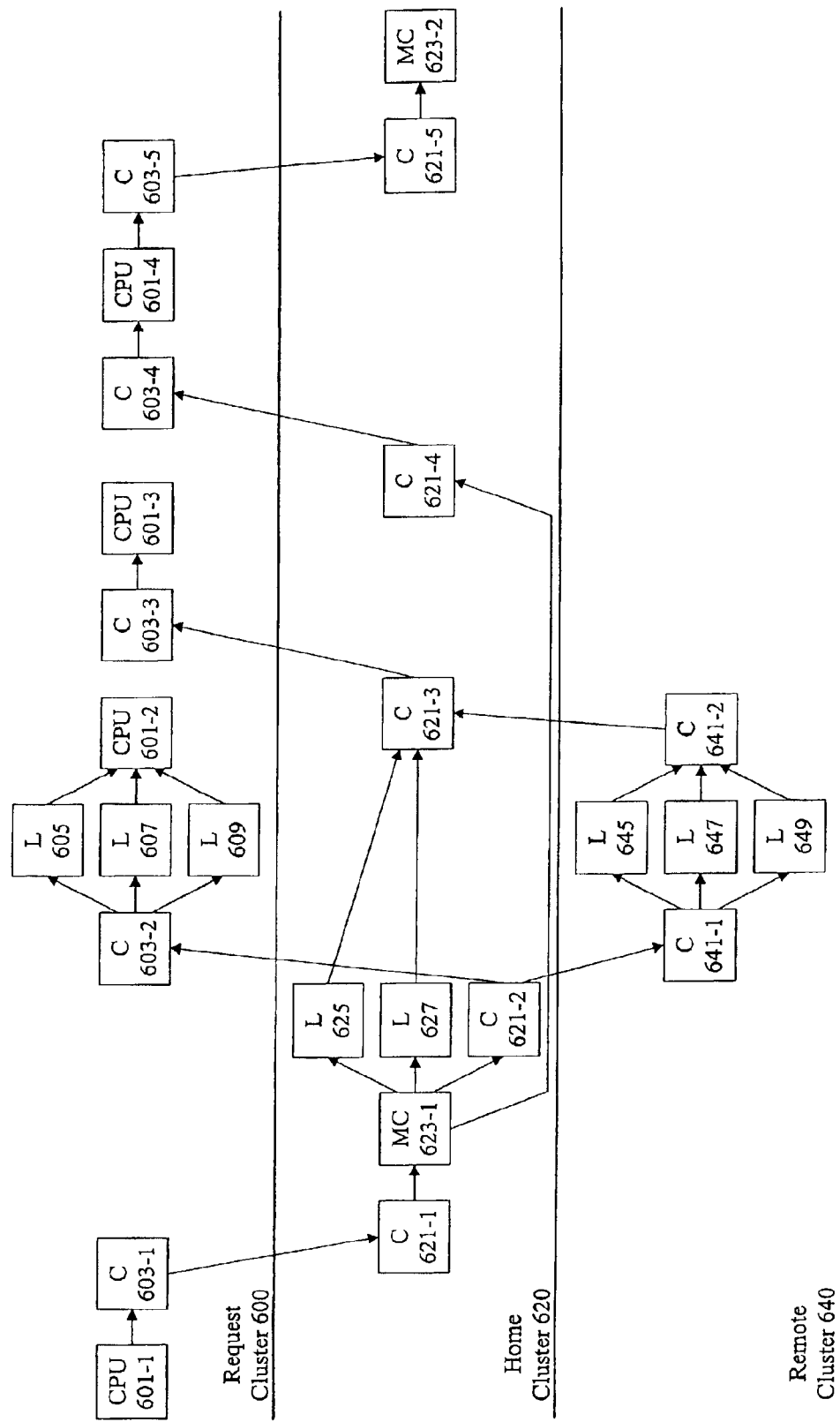
FIG. 6 is a diagrammatic representation depicting a transaction flow probing a remote cluster.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data and all expected responses, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cluster cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop. Techniques for reducing the delay while responding to a request cluster are described in U.S. application Ser. Nos. 10/145,439 and 10/145,438 both titled Methods And Apparatus For Responding To A Request Cluster by David B. Glasco filed on May 13, 2002, the entireties of which are incorporated by reference for all purposes.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A–5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Figure 7:
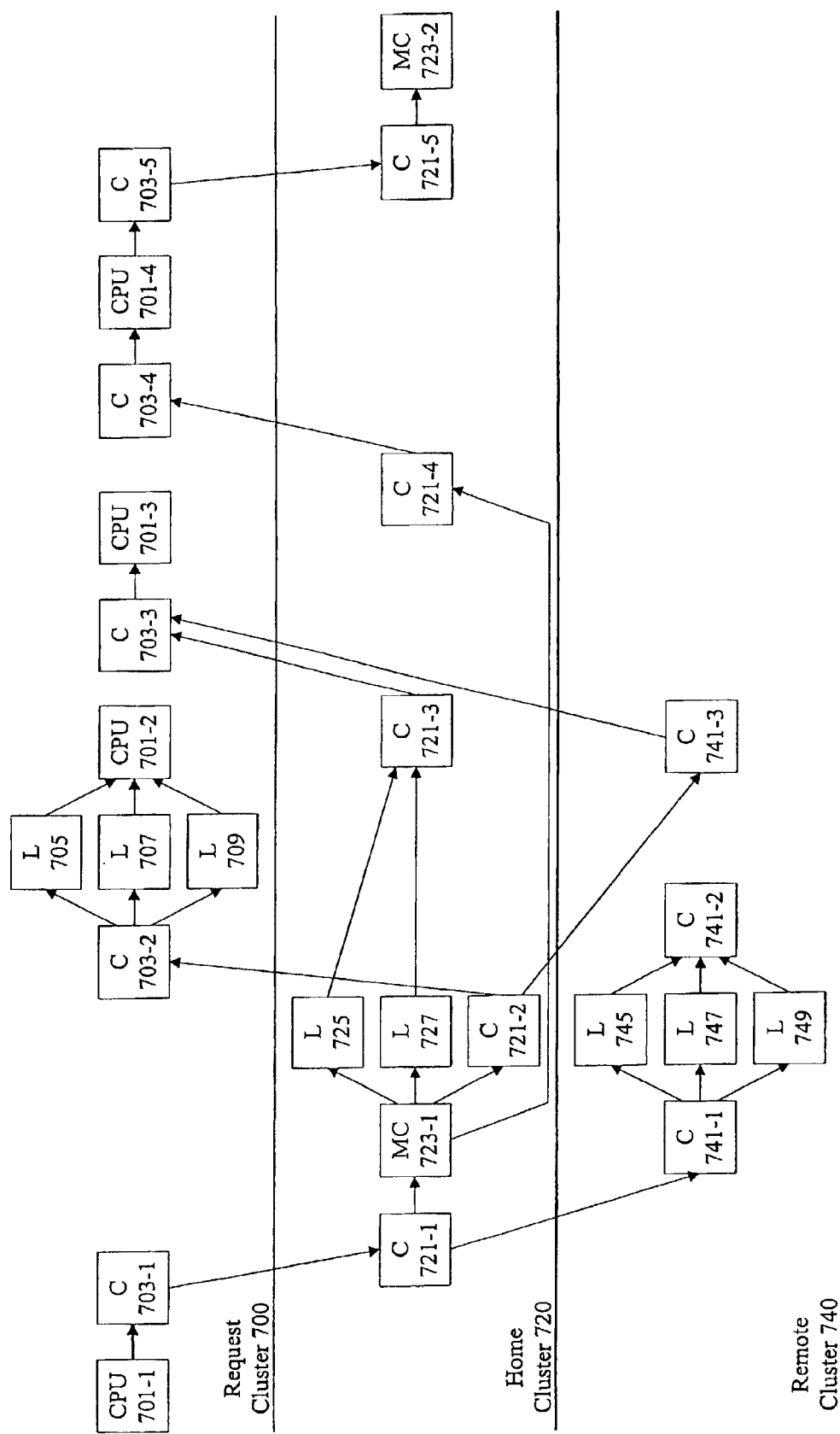
FIG. 7 is a diagrammatic representation showing a transaction flow for a speculative probing from a home cluster.

FIG. 7 is a diagrammatic representation showing one example of a mechanism for performing speculative probing from a home cluster. The processor 701-1 sends a request to a cache coherence controller 703-1. According to various embodiments, a determination of whether to perform speculative probing at a request cluster occurs at this point. In one example, if speculative probing at a request cluster can not be performed, the request is forwarded from the request cluster 700 to a cache coherence controller 721-1 associated with a home cluster 720. According to various embodiments, speculative probing of remote clusters is performed from a home cluster. The cache coherence controller 721-1 forwards the request to memory controller 723-1 and sends a speculative probe to remote cluster cache coherence controller 741-1.

The memory controller 723-1 then proceeds to lock the memory line associated with the request and sends probes to local nodes while cache coherence controller 741-1 sends probes to local nodes 745, 747, and 749. Cache coherence controller 721-2 sends a probe to cache coherence controller 703-2 at request cluster 700 as well as a probe to cache coherence controller 741-3 at remote cluster 740. In one example, the cache coherence controller 723-1 accesses a coherence directory in order to determine what remote clusters to forward probes to. In some instances, probes may be forwarded to all remote clusters. However, some clusters may not need to be probed based on information in the coherence directory and transaction type.

In one example, the coherence directory may instruct cache coherence controller 703-1 to forward speculative probes to some remote clusters based on characteristics of the request. Any criteria associated with a request for selecting what clusters to send probes to are referred to herein as characteristics of a request. In still other examples, a request cluster is speculatively probed as well. According to various embodiments, the cache coherence controllers include pending buffers. Any logic or mechanism for storing information associated with transactions handled by a cache coherence controller is referred to herein as the pending buffer.

Probes are forwarded from cache coherence controller 721-2 to request cluster cache coherence controller 703-2 and remote cluster cache coherence controller 741-3. According to various embodiments, non-speculative probes are forwarded from home cluster 720 to all remote clusters in the system. Probes associated with a particular memory line that are sent after they are serialized at a serialization point are referred to herein as non-speculative probes. The remote cluster cache coherence controller 721-3 receives probe responses from local nodes 725 and 727 and sends a probe response to cache coherence controller 703-3 without having to wait for probe responses from remote clusters. Remote cluster cache coherence controller 741-2 receives probe responses from local nodes 745, 747, and 749 resulting from the speculative probe received at cache coherence controller 741-1 and uses the results to respond to the non-speculative probe received at cache coherence controller 741-3.

According to various embodiments, the latency between receiving the probe at cache coherence controller 741-3 and generating a response is reduced since the results may already be available from the speculative probe received at cache coherence controller 741-1. The remote cluster cache coherence controller 741-3 uses the probe responses resulting from the speculative probe to respond to the non-speculative probe and transmits the probe response to cache coherence controller 703-3 without having to send the probe response through the home cluster. According to other embodiments, the cache coherence controller 741-3 sends the probe response to the home cluster cache coherence controller 721-3. The home cluster cache coherence controller 721-3 aggregates the responses from the remote cluster and the home cluster nodes and transmits a response to the request cluster. It should be noted that the singular form as used herein refers to the singular as well as the plural unless explicitly stated otherwise. For example, when it is stated that a remote cluster generates a response, it should be noted that one or more remote clusters may be generating one or more responses.

The cache coherence controller 703-3 gathers the probe responses from the home cluster and the remote cluster and sends a probe response to processor 701-3 as soon as all non-local probe responses are received. According to various embodiments, speculative probing at a request cluster and speculative probing of remote clusters from a home cluster may have been performed. The processor 701-3 determines that all local node responses have been received by knowing the number of nodes in the local cluster and the type of the initial transaction.

After request cluster processor 701-4 receives a memory response, a done signal is sent to the request cluster cache coherence controller 703-5 and forwarded to the home cluster cache coherence controller 721-5 to clear the pending buffers at the request and home clusters. According to various embodiments, the critical latency of remote probe responses is reduced by speculatively probing nodes in a remote cluster.

According to various embodiments, in order to allow transmission of probe responses directly to a request cluster, the cache coherence controller at a home cluster manages tags used for forwarding probes. Any unit of information used to identify the source of the initial transaction and route a response to a particular destination is referred to herein as a tag. According to various embodiments, a tag includes a transaction identifier, a node identifier and a cluster identifier. When a home cluster cache coherence controller receives a cache access request from a request cluster, it typically generates a new tag from a home cluster tag space and forwards probes to remote clusters using the new tag. According to various embodiments, a probe includes a tag field. When a new tag is generated, the previous tag in the tag field is replaced with the new tag. Tags are described in concurrently filed U.S. patent application Ser. Nos. 10/157,384 titled Transaction Management In Systems Having Multiple Multi-Processor Clusters, Ser. No. 10/156,893 titled Routing Mechanisms In Systems Having Multiple Multi-Processor Clusters, and Ser. No. 10/157,409 titled Address Space Management In Systems Having Multiple Multi-Processor Clusters, all by David B. Glasco, Carl Zeitler, Rajesh Kota, Guru Prasadh, and Richard R. Oehler, the entireties of which are incorporated by reference for all purposes.

Figure 8:
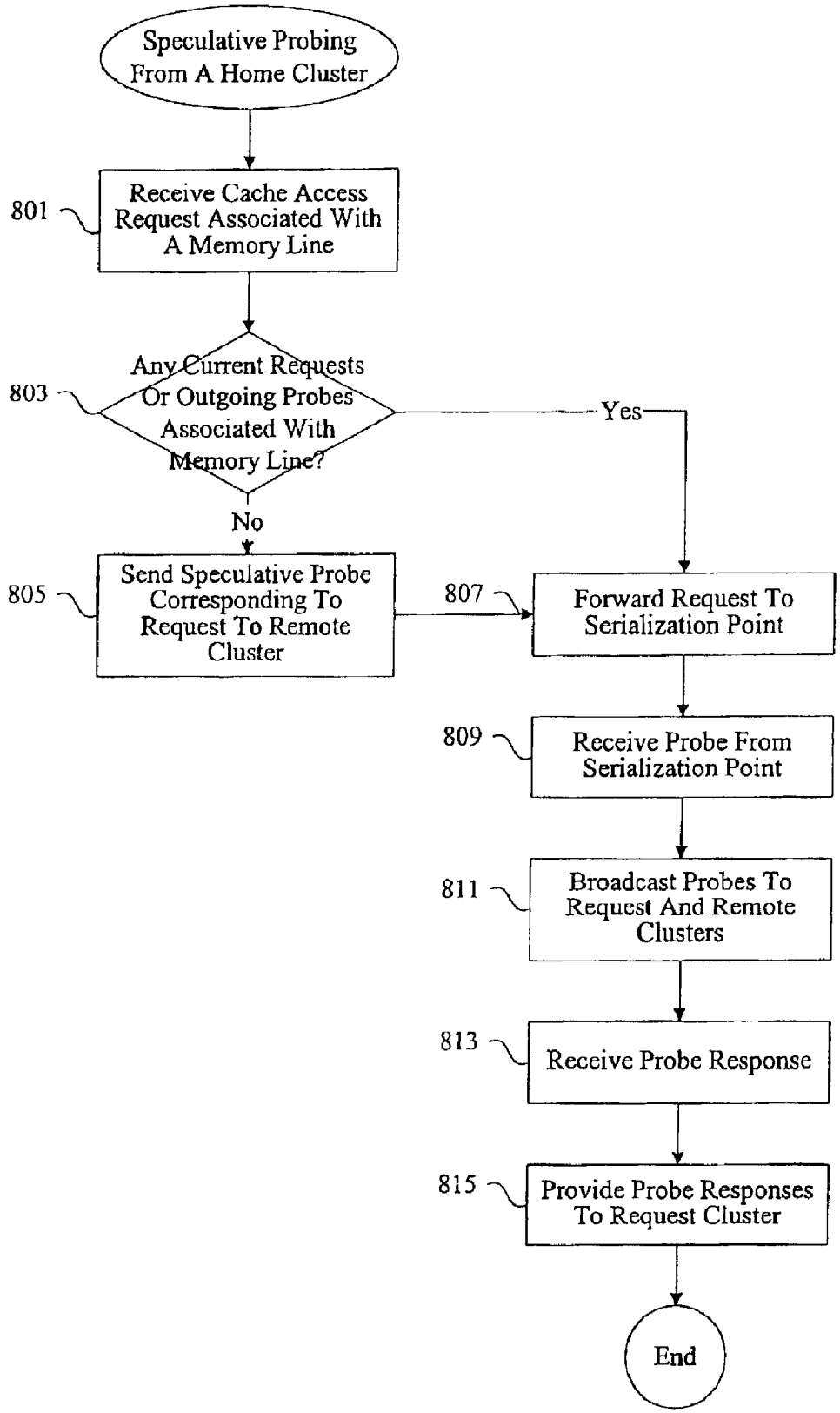
FIG. 8 is a flow process diagram showing speculative probing from a home cluster.

FIG. 8 is a flow process diagram showing one example of speculative probing of a remote cluster from a home cluster. At 801, the cache access request associated with a particular memory line is received, typically from a request cluster. At 803, it is determined if any current requests or outgoing probes, both speculative and non-speculative, are associated with the same memory line. It should be noted that typically cache access requests are ordered at a serialization point such as a memory controller. However, by sending speculative probes from a home cluster to a remote cluster before the cache access requests are serialized may lead to more than one probe being sent out for a particular memory line. Having multiple speculative probes associated with the same memory line may lead to cache coherence the problems.

For example, it would be unclear which one of the multiple speculative probes would arrive at a remote cluster first. According to various embodiments, multiple speculative probes are managed at a home cluster. In one embodiment, if it is determined that there are current requests or outgoing probes, either speculative or non-speculative, associated with the same memory line, no speculative probe is transmitted to a remote cluster. Instead, the cache access request is merely forwarded to a serialization point and the process flow proceeds without speculative probing of the remote cluster from the home cluster. If it is determined that there are no current requests or outgoing probes associated with the same memory line, a speculative probe a corresponding to the request is sent to the remote cluster at 805. A speculative probe can be issued in this instance since no other probes associated with the same memory line would alter or potential alter the contents associated with the memory line. The request is then forwarded to a serialization point at 807.

It should be noted that although the present flow process diagram shows the speculative probe being sent to a remote cluster before the request is forwarded to a serialization point, both actions can occur substantially simultaneously. In other embodiments, a request may be forwarded to a serialization point before the speculative probe corresponding to the request is sent to a remote cluster. However, the sooner the speculative probe is issued, the more likely the results of the speculative probe will have been obtained by the time the non-speculative probe arrives at the remote cluster cache coherence controller.

At 809, the home cluster cache coherence controller receives a probe from the serialization point. The cache coherence controller at 811 then broadcasts non-speculative probes to the various request and remote clusters. It should be noted that in various examples, speculative probes do not have to be sent out because a home cluster cache coherence controller will broadcast non-speculative probes to request and remote clusters at 811. At 813, probe responses are received from local nodes in the home cluster as well as possibly from a remote cluster cache coherence controller. According to various embodiments, the home cluster cache coherence controller aggregates probe responses from the home cluster as well as any remote cluster and provides the probe responses to the request cluster at 815. According to other embodiments, the home cluster cache coherence controller merely provides probe responses from local nodes in the home cluster to a request cluster, since a remote cluster cache coherence controller provides probe responses directly to the request cluster.

Figure 9:
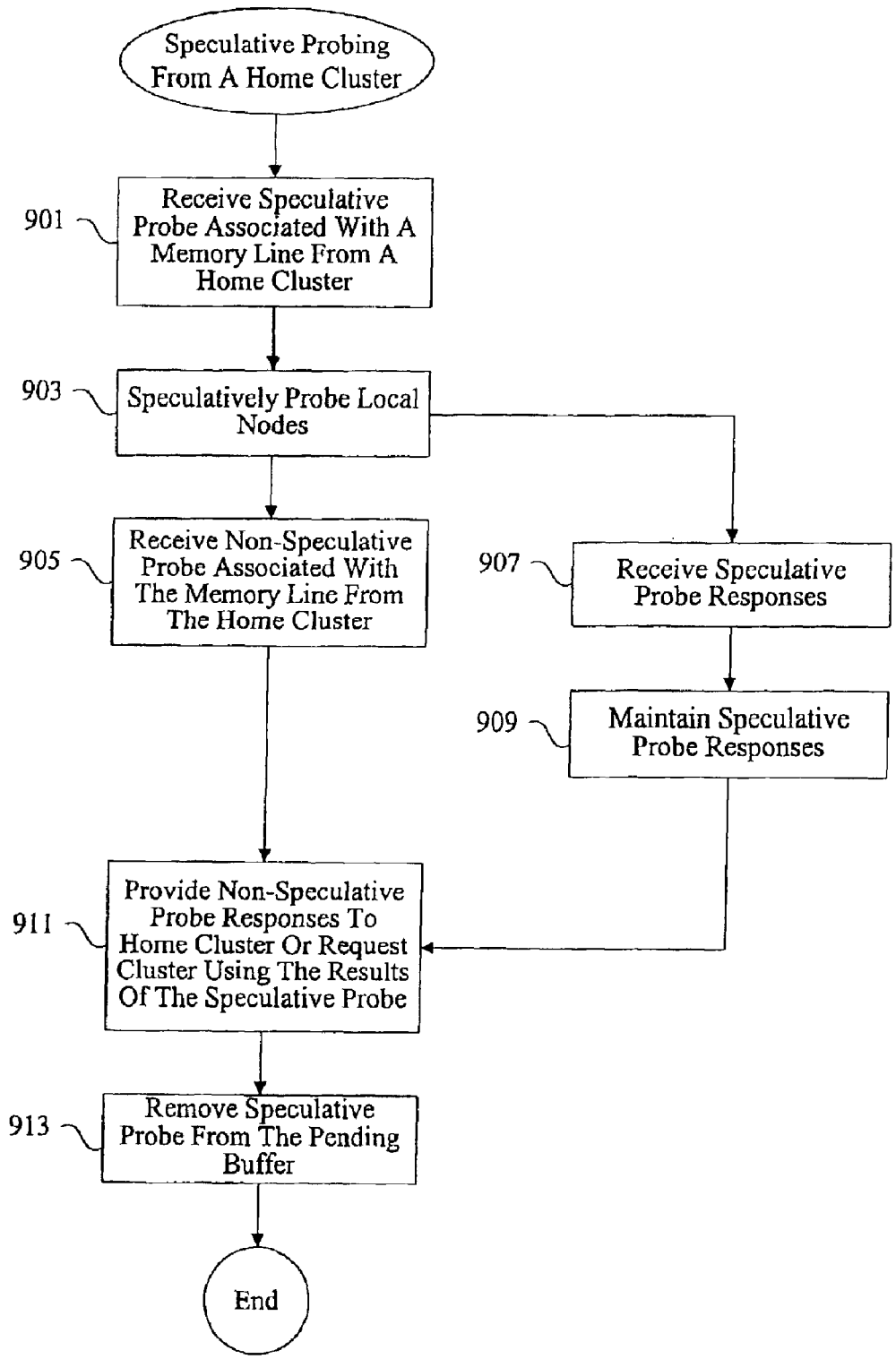
FIG. 9 is a flow process diagram showing speculative probing from a home cluster at a remote cluster.

FIG. 9 is a flow process diagram showing one example of speculative probing from a home cluster at a remote cluster cache coherence controller. At 901, a speculative probe associated with a memory line is received from a home cluster. At 903, local nodes are probed. According to various embodiments, the responses to the speculative probes are received at 907 and maintained at 909. In one example, the speculative probe responses are maintained in a pending buffer associated with the remote cluster cache coherence controller. At some point during the process of speculative probing, a non-speculative probe associated with the same memory line is received from the home cluster at 905. In some examples, a non-speculative probe may be received after all the speculative probe responses are received and maintained at 909. In other examples, a non-speculative probe could possibly be received at approximately the same time the speculative probe is received.

In some instances, a non-speculative probe associated with a particular memory line may be received before the speculative probe associated with the same memory line. If the speculative probe is received before the non-speculative probe, the speculative probe may simply be dropped. According to various embodiments, the speculative probes are dropped if a non-speculative probe response corresponding to the same memory line has not yet been provided to a home cluster or a request cluster.

In typical examples, however, it is expected that a speculative probe would be received before a non-speculative probe. The speculative probe responses could then be used to provide information for responding to the non-speculative probe at 911. By speculatively probing a remote cluster, responses can be provided more quickly when a non-speculative probe is received. Without speculative probing at a remote cluster, local nodes would not be probed until the non-speculative probe is received. The probe responses are provided to the home cluster or the request cluster at 911. At 913, the speculative probe and any associated information is removed from the pending buffer.

Speculative probing at a remote cluster reduces the latency between receiving a non-speculative probe at a remote cluster and generating the response, since information associated with the probe responses of the speculative probe can be used to provide the non-speculative probe response. In typical implementations, a home cluster sends a speculative probe to a remote cluster after receiving a cache access request from a request cluster. The home cluster sends a non-speculative probe to the remote cluster after the cache access request is ordered at a serialization point. According to various embodiments of the present invention, sending a speculative probe from a home cluster provides assurance that only a single speculative probe for a given memory line will be present in the pending buffer of the remote cluster at any given time. The remote cluster need not track multiple speculative probes associated with the same memory line from multiple clusters since any probe, both speculative and non-speculative, will be managed and sent from home cluster.

The techniques of the present invention recognize that speculatively probing a remote cluster can further be enhanced by sending a speculative probe from a request cluster to a remote cluster at the same time the request is forwarded to the home cluster instead of sending a request to the home cluster and waiting for the home cluster to send a speculative probe to the remote cluster.

Figure 10:
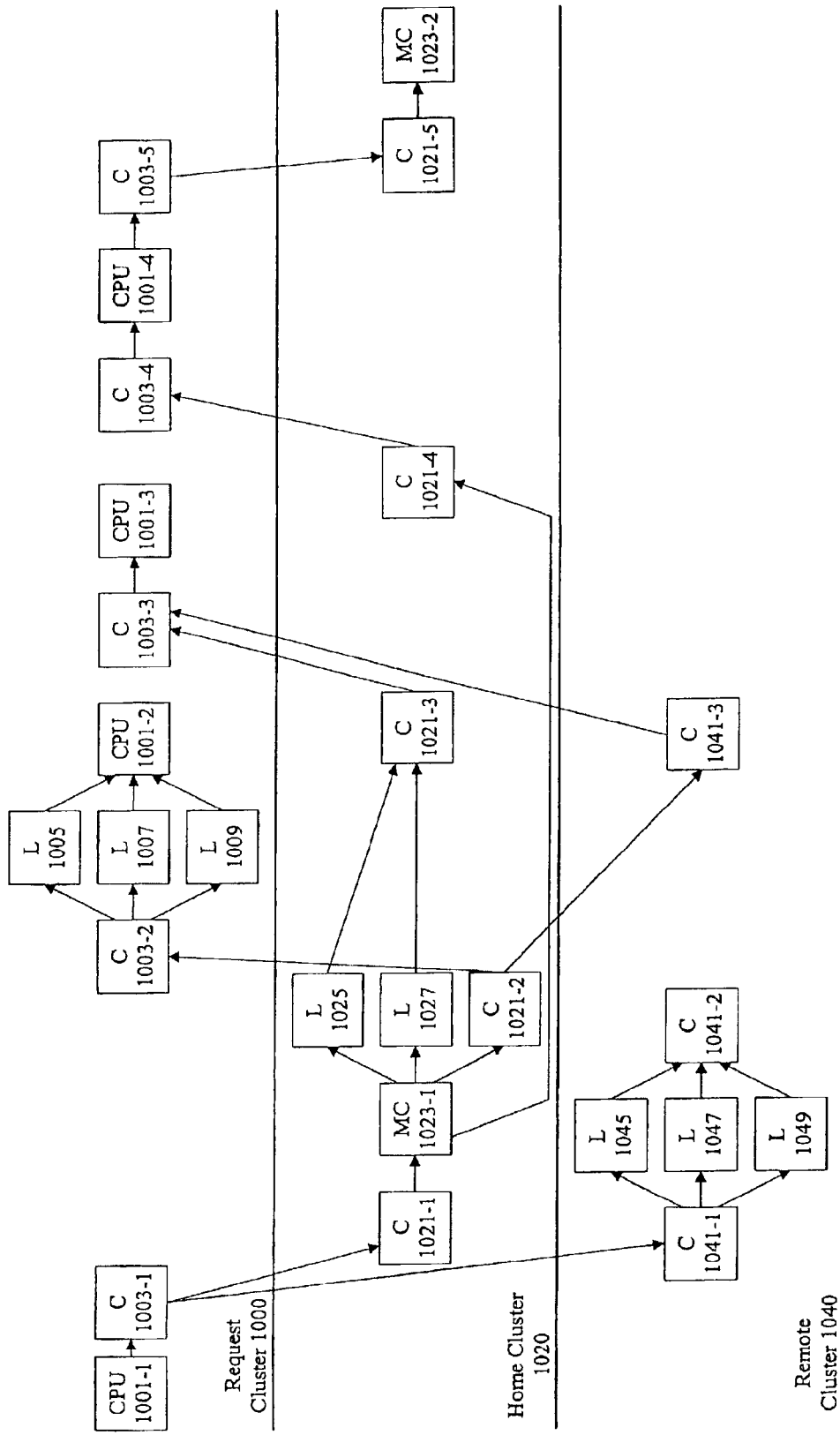
FIG. 10 is a diagrammatic representation showing a transaction flow for a speculative probing from a request cluster.

FIG. 10 is a diagrammatic representation showing one example of speculatively probing a remote cluster from a request cluster. According to various embodiments, a processor 1001-1 sends a request to a cache coherence controller 1003-1. The request is forwarded from the request cluster 1000 to a cache coherence controller 1021-1 associated with a home cluster 1020. According to various embodiments, a speculative probe is sent to a cache coherence controller 1041-1 at substantially the same time the request is forwarded to a home cluster.

The cache coherence controller 1021-1 at the home cluster 1020 forwards the request to memory controller 1023-1. The memory controller 1023-1 then proceeds to lock the memory line associated with the request and sends probes to all local nodes.

Probes are forwarded from cache coherence controller 1021-2 to request cluster cache coherence controller 1003-2 and remote cluster cache coherence controller 1041-3. Remote cluster cache coherence controller 1041-2 receives probe responses from local nodes 1045, 1047, and 1049 resulting from the speculative probe received at cache coherence controller 1041-1 from a request cluster 1000 and uses the results to respond to the non-speculative probe received at cache coherence controller 1041-3. According to various embodiments, the latency between receiving the probe at cache coherence controller 1041-3 and generating a response is reduced since the results may already be available from the speculative probe received at cache coherence controller 1041-1. The remote cluster cache coherence controller 1041-3 uses the probe responses resulting from the speculative probe to respond to the non-speculative probe and transmits the probe response to cache coherence controller 1003-3 without having to send the probe response through the home cluster. According to other embodiments, the cache coherence controller 1041-3 sends the probe response to the home cluster cache coherence controller 1021-3. The home cluster cache coherence controller 1021-3 aggregates the responses from the remote cluster and the home cluster nodes and transmits a response to the request cluster.

Figure 11:
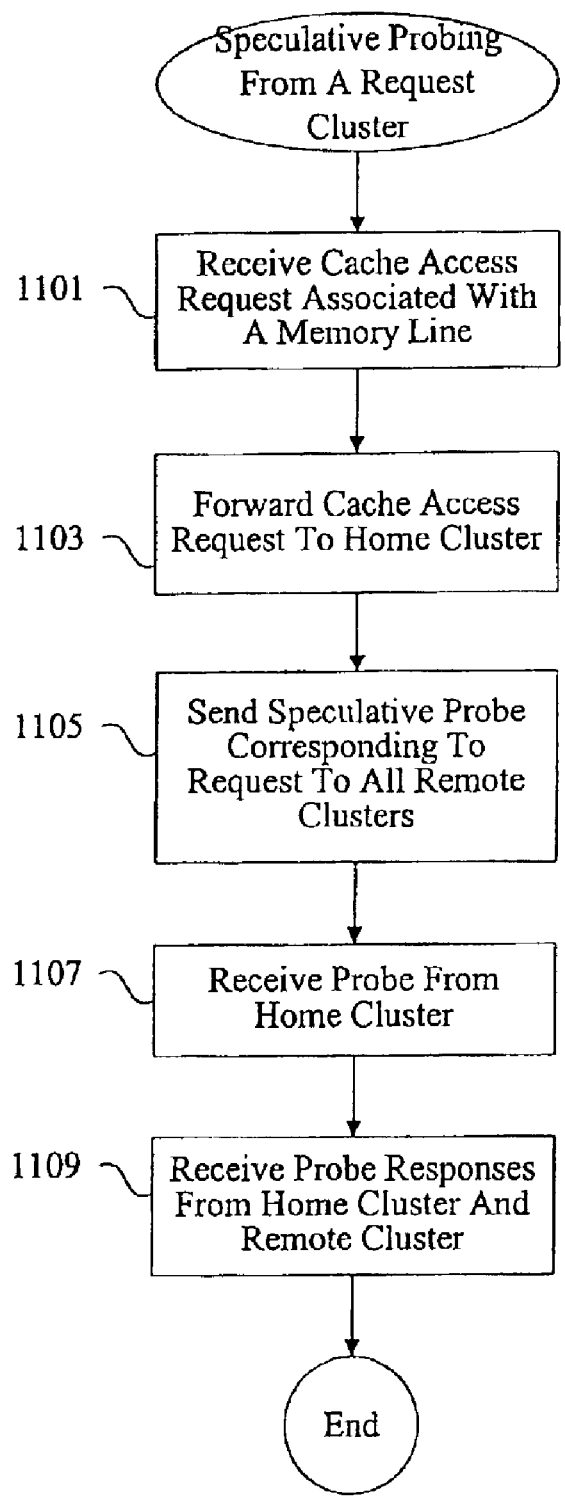
FIG. 11 is a flow process diagram showing speculative probing from a request cluster.

FIG. 11 is a flow process diagram showing speculative probing of a remote cluster from a request cluster. At 1101, a cache access request associated with a particular memory line is received at a request cluster cache coherence controller. In one example, the cache access request is received from a processor. At 1103, the cache access request is forwarded to a home cluster. At substantially the same time, a speculative probe associated with the memory line is sent to a remote cluster. According to various embodiments, speculative probes are sent to all remote clusters in the system. At 1107, a non-speculative probe is received from a home cluster. According to various embodiments, the home cluster sends non-speculative probes to all clusters in the system including all remote clusters as well as the request cluster. At 1109, probe responses are received from the home cluster as well as any remote clusters. According to various embodiments, an aggregated probe response is sent from a home cluster after the home cluster receives probe responses from the remote clusters. In another example, probe responses are received from the home cluster and remote cluster and the responses are aggregated at the request cluster cache coherence controller.

Speculatively probing a remote cluster from a request cluster reduces the latency between a remote cluster receiving a non-speculative probe and a remote cluster generating a response. Speculatively probing a remote cluster from a home cluster also potentially reduces latency more than speculatively probing a remote cluster from a request cluster. That is, by sending a speculative probe from a request cluster, speculative probing at a remote cluster can complete sooner than speculatively probing from a home cluster. Information associated with the speculative probe responses would consequently be available sooner for providing a response to the non-speculative probe from the home cluster.

According to various embodiments, sending speculative probes from a request cluster instead of from a home cluster introduces risk that multiple speculative probes from different request clusters are received at a remote cluster at substantially the same time. Speculatively probing a remote cluster from a home cluster allows management of multiple speculative probes from different request clusters at a home cluster cache coherence controller. In one example, a home cluster cache coherence controller recognizes that a non-speculative probe associated with a particular memory line has already been sent to the remote cluster. When the home cluster cache coherence controller receives the cache access request associated with the same memory line, the home cluster cache coherent controller can elect not to send out a speculative probe associated with that memory line to the remote clusters. However, without the management and intelligence of the home cluster cache coherence controller, remote clusters may receive multiple probes, both speculative and non-speculative, associated with the same memory line from different request clusters.

Figure 12:
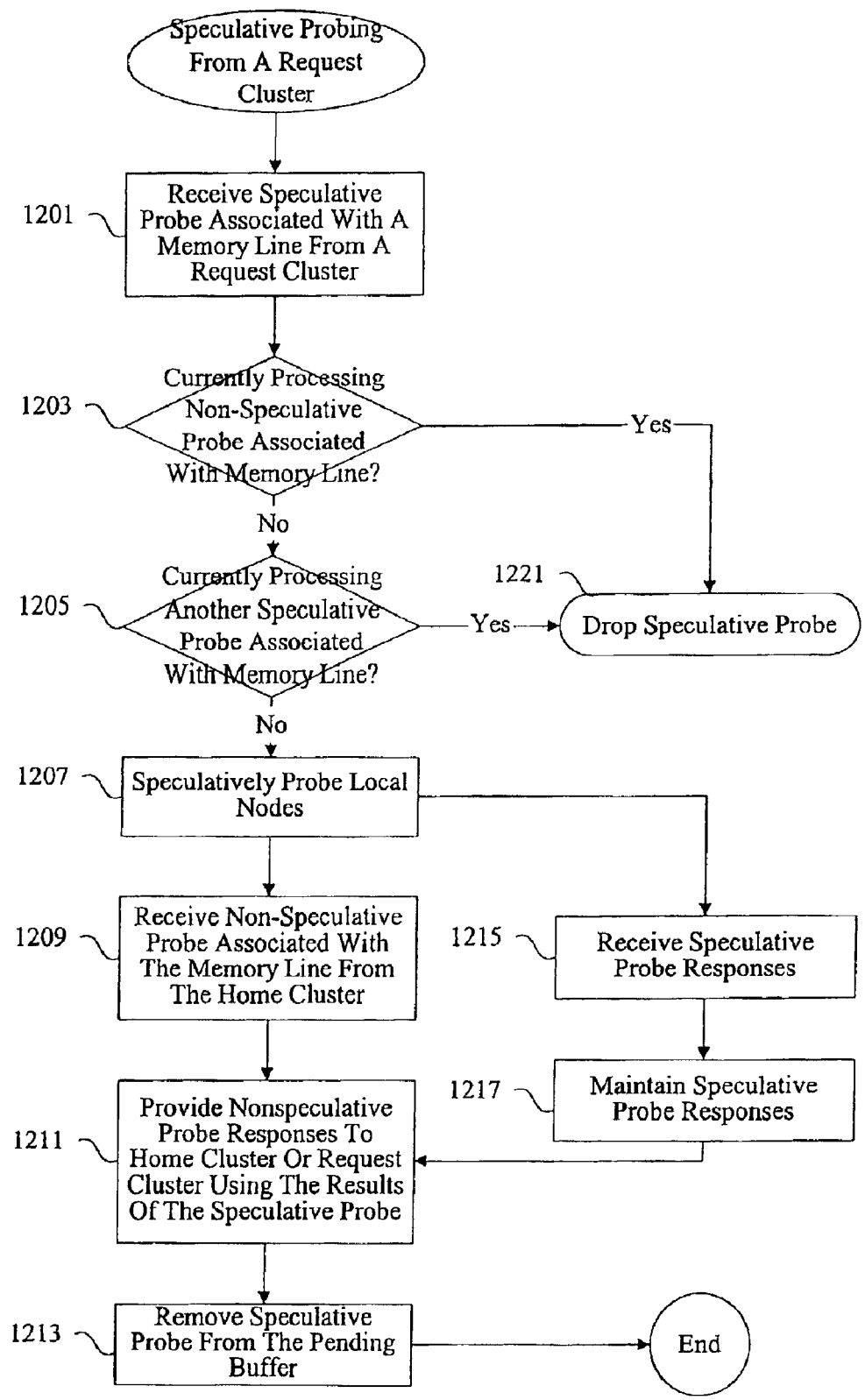
FIG. 12 is a flow process diagram showing speculative probing from a request cluster at a remote cluster.

According to various embodiments, the techniques of the present invention provide mechanisms for managing multiple probes, both speculative and non-speculative, resulting from speculative probing of remote clusters from request clusters. FIG. 12 is a flow process diagram showing one example of speculative probing from a request cluster at a remote cluster.

At 1201, a speculative probe associated with a memory line is received from a request cluster. At 1203, it is determined if the remote cluster is currently processing a non-speculative probe associated with the same memory line. In one embodiment, a determination of whether the remote cluster is currently processing a non-speculative probe associated with the same memory line can be made by examining the pending buffer. If such processing is being performed, the speculative probe from the request cluster is dropped. If no such processing is being performed, it is determined at 1205 if the remote cluster is currently processing another speculative probe associated with the same memory line. If the remote cluster is processing another speculative probe associated with the same memory line, the speculative probe received at 1201 is dropped at 1221. It should be noted that speculative probes can generally be dropped as the remote cluster will eventually receive a non-speculative probe from the home cluster after the cache access request is serialized.

If the remote cluster is not currently processing a probe associated with the same memory line, local nodes are speculatively probing at 1207. Speculative probe responses resulting from the speculative probe of local nodes is received at 1215. At 1217, speculative probe responses are maintained. At 1209, a non-speculative probe associated with the memory line is received from the home cluster. According to various embodiments, speculative probing of a remote cluster from a request cluster provides speculative probe responses sooner than speculative probing of a remote cluster from the home cluster. Speculatively probing a remote cluster from a request cluster increases the likelihood that speculative probe responses will already be available when a non-speculative probe associated with the same memory line is received from the home cluster at 1209. At 1211, non-speculative probe responses are provided to the home cluster or to the request cluster using the results of the speculative probe. At 1213, the speculative probe is removed from the pending buffer.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A computer system, comprising:
   a request cluster including a plurality of interconnected request cluster processors and a request cluster cache coherence controller;
   a home cluster including a plurality of interconnected home processors, a serialization point, and a home cache coherence controller; and
   a remote cluster including a plurality of interconnected remote processors and a remote cache coherence controller, wherein the remote cluster is configured to receive a first probe corresponding to a cache access request from a request cluster processor in the request cluster and a second probe corresponding to the cache access request from the home cluster.

2. The computer system of claim 1, wherein the first probe is a speculative probe.

3. The computer system of claim 2, wherein the second probe is a non-speculative probe.

4. The computer system of claim 2, wherein the results of the first probe are used in a probe response corresponding to the second probe.

5. The computer system of claim 4, wherein the first probe is dropped if the second probe is received before the first probe.

6. The computer system of claim 4, wherein the first probe is dropped if a third probe corresponding to a memory line associated with the cache access request is received before the first probe.

7. The cache coherence controller of claim 6, wherein the request cluster cache coherence controller is constructed to act as an aggregate remote cache.

8. The cache coherence controller of claim 6, wherein the request cluster cache coherence controller is constructed to act as a probing agent pair.

9. The cache coherence controller of claim 6, wherein the request cluster cache coherence controller is constructed to act as a remote memory.

10. The cache coherence controller of claim 6, wherein the request cluster cache coherence controller is constructed to act as a remote processor.

11. A method for a cache coherence controller to manage data access in a multiprocessor system, the method comprising:
    receiving a cache access request from a request cluster processor associated with a request cluster;
    forwarding the cache access request to a home cluster, the home cluster including a home cluster cache coherence controller and a serialization point; and
    sending a probe associated with the cache request to a remote cluster.

12. The method of claim 11, wherein sending the probe associated with the cache request comprises sending a probe to a remote cluster cache coherence controller before a memory line associated the probe is locked.

13. The method of claim 11, wherein a plurality of request cluster processors in the request cluster share a memory address space with a plurality of home processors in the home cluster.

14. The method of claim 11, wherein sending the probe to the remote cluster comprises sending a probe to the remote node before a request associated with the probe is received at a memory access serialization point.

15. A computer system, comprising:
    a first cluster including a first plurality of processors and a first cache coherence controller, the first plurality of processors and the first cache coherence controller interconnected in a point-to-point architecture;
    a second cluster including a second plurality of processors and a second cache coherence controller, the second plurality of processors and the second cache coherence controller interconnected in a point-to-point architecture, the first cache coherence controller coupled to the second cache coherence controller;
    wherein the first cache coherence controller is configured to receive a cache access request originating from the first plurality of processors and send a probe to a third cluster including a third plurality of processors before the cache access request is received by a serialization point in the second cluster.

16. The computer system of claim 15, wherein the memory access serialization point is a memory controller in the second cluster.

17. The computer system of claim 16, wherein the probe is associated with the memory line corresponding to the cache access request.

18. The computer system of claim 15, wherein the third cluster includes a third cache coherence controller.

19. The computer system of claim 17, wherein the third cache coherence controller is further configured to receive a probe originating from the second cluster and respond to the probe originating from the second cluster using information obtained from the probe of the first plurality of processors.

20. The computer system of claim 19, further comprising a pending buffer associated with the first cache coherence controller.

21. A computer system, comprising:
a first cluster including a first plurality of processors and a first cache coherence controller, the first plurality of processors and the first cache coherence controller interconnected in a point-to-point architecture;
a second cluster including a second plurality of processors and a second cache coherence controller, the second plurality of processors and the second cache coherence controller interconnected in a point-to-point architecture, the first cache coherence controller coupled to the second cache coherence controller and constructed to receive a cache access request originating from the first plurality of processors and send a probe to a third cluster including a third plurality of processors before a memory line associated with the cache access request is locked.

22. A cache coherence controller, the cache coherence controller comprising:
interface circuitry coupled to a request cluster processor in a request cluster and a remote cluster cache coherence controller in a remote cluster;
a protocol engine coupled to the interface circuitry, the protocol engine configured to receive a cache access request from the request cluster processor and speculatively probe a remote node in the remote cluster.

23. The cache coherence controller of claim 22, wherein the protocol engine is further configured to speculatively probe the remote node by sending a probe to the remote node before a memory line associated the probe is locked.

24. The cache coherence controller of claim 22, wherein the request cluster processor shares a memory address space with a remote cluster processor.

25. The cache coherence controller of claim 24, wherein the request cluster includes a plurality of processors interconnected in a point-to-point architecture.

26. The cache coherence controller of claim 24, wherein the remote cluster includes a plurality of processors interconnected in a point-to-point architecture.

27. The cache coherence controller of claim 22, wherein the protocol engine is further configured to speculatively probing a remote node by sending a probe to the remote cache coherence controller associated with the remote node before a request associated with the probe is received at a memory access serialization point.

28. The cache coherence controller of claim 27, wherein the memory access serialization point is a memory controller in a home cluster.

29. The cache coherence controller of claim 22, wherein the cache coherence controller is constructed to act as an aggregate remote cache.

30. The cache coherence controller of claim 22, wherein the cache coherence controller is constructed to act as a probing agent pair.

31. The cache coherence controller of claim 22, wherein the cache coherence controller is constructed to act as a remote memory.

32. The cache coherence controller of claim 22, wherein the cache coherence controller is constructed to act as a remote processor.

33. The cache coherence controller of claim 22, wherein the protocol engine, the request cluster processor, and the remote cluster processor support a coherence protocol.

34. The cache coherence controller of claim 33, wherein the request cluster cache coherence controller is coupled to the remote cluster cache coherence controller through a point-to-point architecture.

35. The cache coherence controller of claim 33, wherein the request cluster cache coherence controller is coupled to the remote cluster cache coherence controller through a switch architecture.

36. A cache coherence controller, comprising:
means for receiving a cache access request from a request cluster processor associated with a request cluster;
means for forwarding the cache access request to a home cluster, the home cluster including a home cluster cache coherence controller and a serialization point; and
means for sending a probe associated with the cache request to a remote cluster.

* * * * *